Feb. 22, 1955    C. H. SNYDER ET AL    2,702,698
BIT FOR ROTARY COAL CUTTING MACHINES
Filed Sept. 8, 1949    3 Sheets-Sheet 1
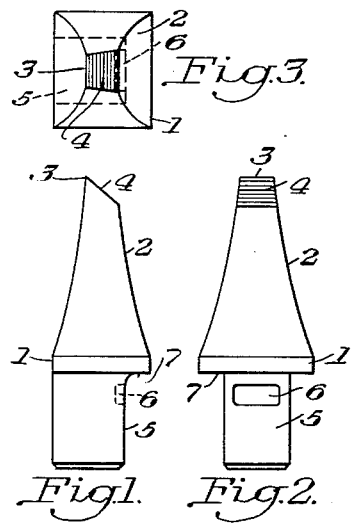
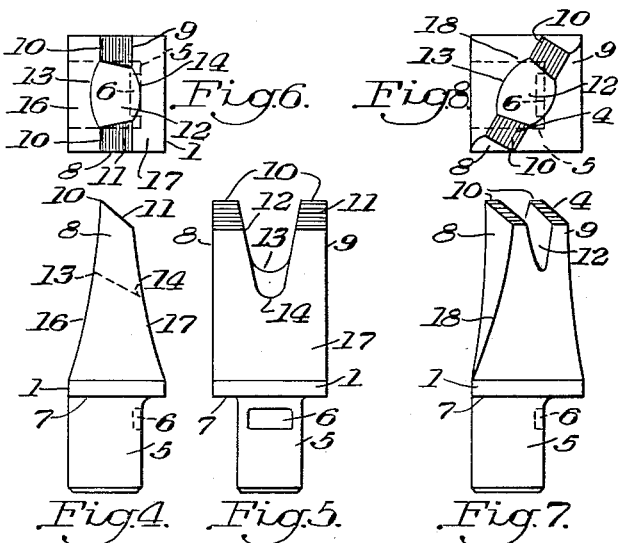
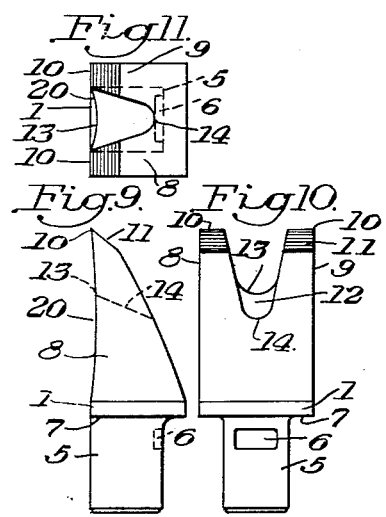
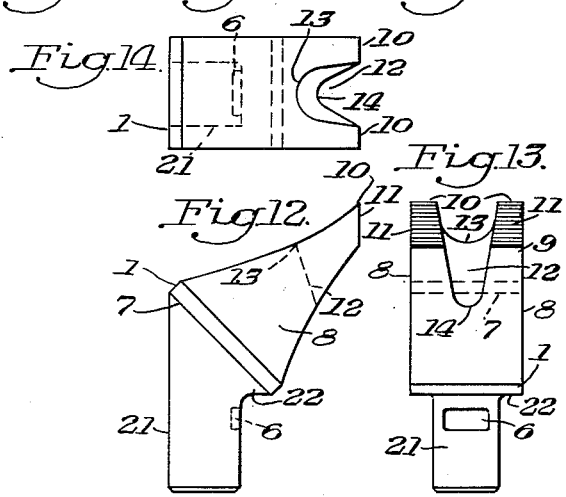
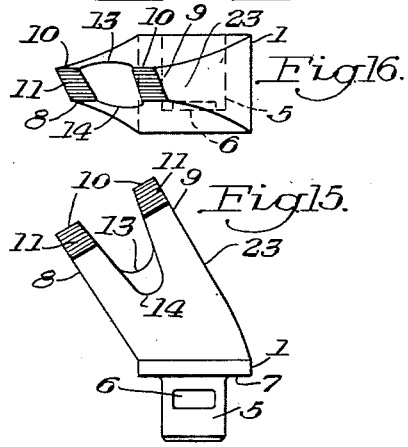
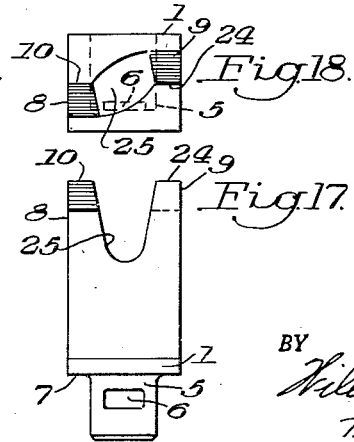
INVENTORS.
Clifford H. Snyder, and
James M. Hill
BY
William D. Carothers
THEIR ATTORNEY

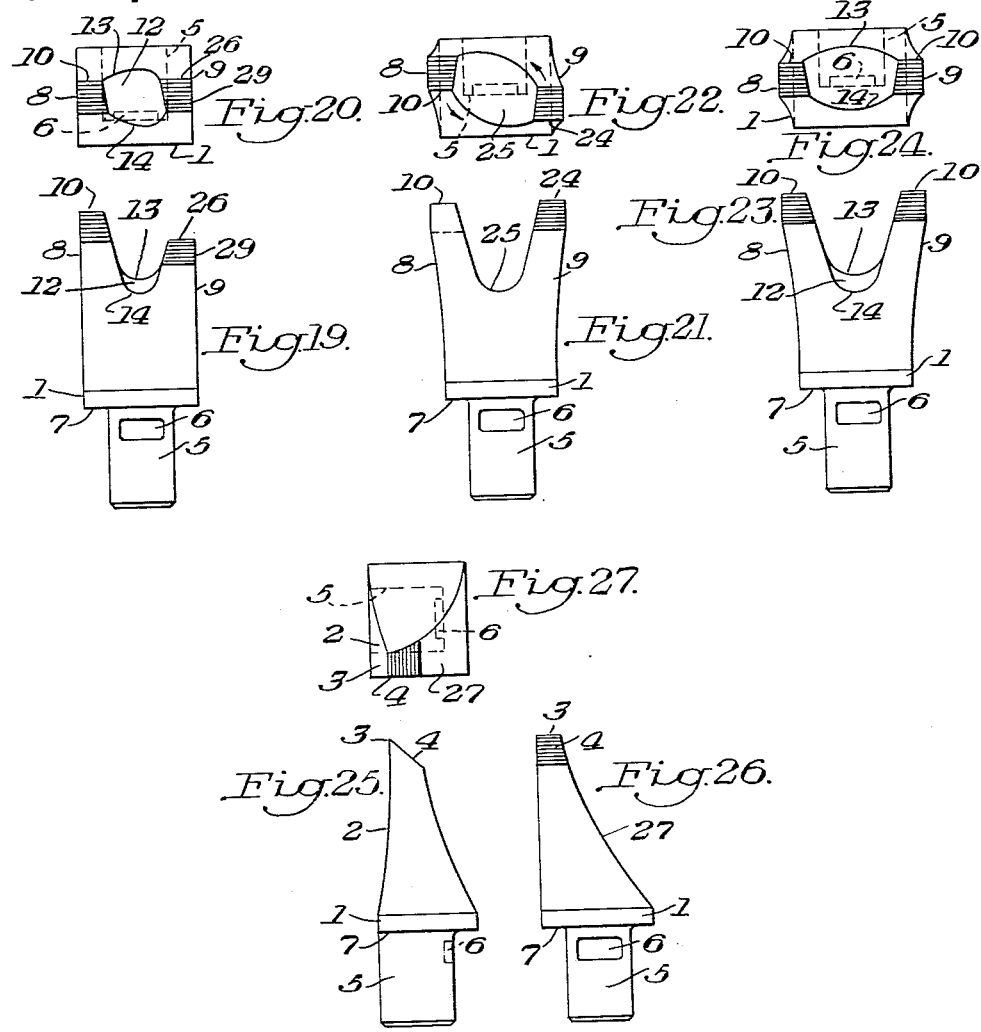

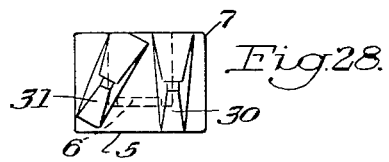
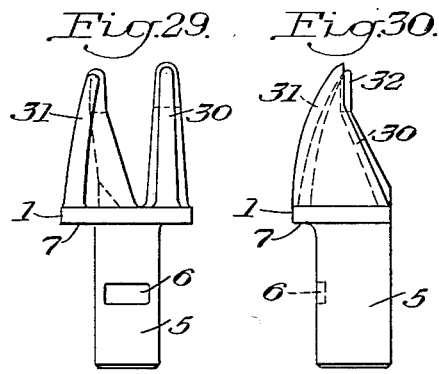
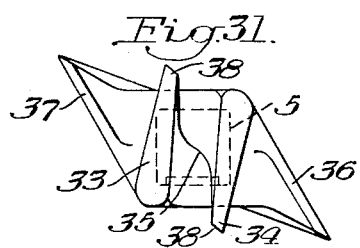
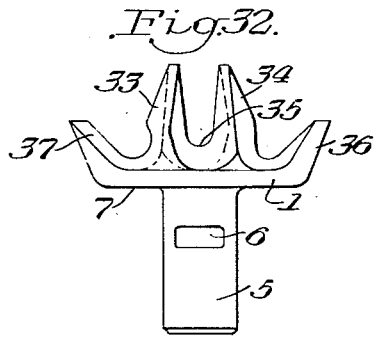
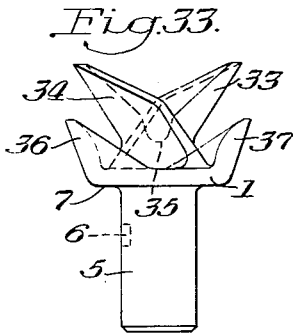

United States Patent Office 2,702,698
Patented Feb. 22, 1955

2,702,698

BIT FOR ROTARY COAL CUTTING MACHINES

Clifford H. Snyder, Dormont, Pa., and James M. Hill, Morgantown, W. Va., assignors, by mesne assignments, to The Colmol Company, New Lexington, Ohio, a corporation of Ohio Application September 8, 1949, Serial No. 114,552

4 Claims. (Cl. 262—33)

This invention relates generally to cutting tools and more particularly to bits for use on rotary coal cutting machines.

A cutting bar is commonly employed on coal cutting machines and consists of one or more rotary driven endless chains having spaced sockets for receiving bits which are arranged to cut clearance in the coal for the chain and its supporting bar structure. These cutting bars are mounted to cut either horizontally, for under and over cutting into the coal face, or vertically, for cutting the sides of the coal face. A series of cutting bars have been disclosed in the art to simultaneously cut a multiple of parallel slots or a section of the coal face. Invariably, this type of coal cutting machine requires the bits to cut kerfs substantially parallel to the vertical or horizontal cleavage planes of the coal which places a very heavy load on the cutting profile of the bits as well as on the machine.

Another and novel method of mining coal is to employ a radial series of spaced bits in a rotary chipping head wherein the bits chip a series of concentric kerfs that continuously cross the vertical and horizontal cleavage planes of the coal. By this method the coal is chipped from the solid ahead of the bit particularly when the pressure on the coal in the path of the rotary chipping head is relieved by arranging the bits in a progressive receding manner on the head, with the bits adjacent the center of rotation leading those adjacent the outer periphery of the cutting head.

One of the most popular mining bits used in practice is substantially square in cross section and is provided with a negative rake extending from the cutting edge to part way back the shank and bent slightly placing the cutting edge beyond the body of the shank. Such a bit is usually tipped with a hard alloy or a tungsten carbide insert and is wedged, seated or otherwise locked in a socket.

Although such a bit is economical to manufacture and is readily replaced, they frequently break and the machine has to be stopped to replace them. Many different modifications of these bits have been employed. They appear in different shapes, sizes and cross sections, but their life and failure in service is within a very close range of each other.

Frequently the bit is held in its socket by a wedge which often becomes loose causing the bit to drop out of the socket.

Another difficulty with such a mining machine bit resides in the manner that the cutting forces are transferred from the cutting edge through the body to the socket that holds the bit. Again, a relatively flat or straight shanged bit is difficult to mount in some sockets. If wedges are employed in an open ended tubular socket, it is difficult to eject the stub of a broken bit and it is likewise difficult to dislodge the wedge even though the sockets may be open in the rear.

It is the purpose of this invention to provide a bit for chain or rotary chipping heads that overcomes these difficulties and provides a tooth portion which continuously increases in cross section from the cutting edge to the body of the bit. The mounting shank, extending from the body, leaves a shoulder through which the maximum forces are transmitted to the socket. The shank in this instance functions to transmit the cutting load and prevents rotation of the bit in the socket, and also retains the bit in the socket.

Other objects and advantages appear hereinafter in the following description and claims.

The accompanying drawings show, for the purpose of exemplification without limiting the invention or the claims thereto, certain practical embodiments of the invention wherein:

Fig. 1 is a side elevation of a single tooth bit;
Fig. 2 is a front elevation of the bit shown in Fig. 1;
Fig. 3 is a plan view of the bit shown in Fig. 1;
Fig. 4 is a side elevation of a symmetrically arranged double pointed bit;
Fig. 5 is a front elevation of the bit shown in Fig. 4;
Fig. 6 is a plan elevation of the bit shown in Fig. 4;
Fig. 7 is a side elevation of a double pointed bit with the teeth twisted relative to the body of the bit;
Fig. 8 is a plan view of the structure shown in Fig. 7;
Fig. 9 is a side elevation of the double pointed bit wherein the cutting point lies beyond the body of the bit;
Fig. 10 is a front elevation of the bit shown in Fig. 9;
Fig. 11 is a plan view of the structure shown in Fig. 9;
Fig. 12 is a side elevation of a double pointed bit having its shank disposed angularly relative to the body of the bit;
Fig. 13 is a front elevation of the bit shown in Fig. 12;
Fig. 14 is a plan view of the bit shown in Fig. 12;
Fig. 15 is a front elevation of a two pointed bit wherein the teeth are disposed in an angle lateral to that of the shank;
Fig. 16 is a plan view of the bit shown in Fig. 15;
Fig. 17 is a front elevation of the two pointed bit wherein the cutting edges are disposed on opposite faces of the bit;
Fig. 18 is a plan view of the bit as shown in Fig. 17;
Fig. 19 is a front elevation of a two pointed bit wherein one cutting point is shorter than the other;
Fig. 20 is a plan view of the bit shown in Fig. 19;
Fig. 21 is a front elevation of a two pointed bit wherein the cutting points of the bit overlie the body portion and are set at diagonally opposite corners of the bit;
Fig. 22 is a plan view of the bit shown in Fig. 21;
Fig. 23 is a front elevation of a two pointed bit having its cutting points extending beyond the sides of the body of the bit and disposed in a common transverse plane;
Fig. 24 is a plan view of the bit shown in Fig. 23;
Fig. 25 is a side elevation of a single pointed bit with the cutting point disposed on one side of the bit;
Fig. 26 is a front elevation of the bit shown in Fig. 25;
Fig. 27 is a plan view of the bit shown in Fig. 25;
Fig. 28 is a top plan view of a two pointed bit having one cutting profile disposed at an angle relative to the cutting profile of the other;
Fig. 29 is a view in front elevation of the bit shown in Fig. 28;
Fig. 30 is a view in side elevation of the bit shown in Fig. 28;
Fig. 31 is a top plan view of a four pointed bit having two points in opposite symmetrical relation to the other two points;
Fig. 32 is a view in front elevation of the bit shown in Fig. 31; and
Fig. 33 is a view in side elevation of the bit shown in Fig. 31.

Referring to Figs. 1 to 3 of the drawings, the bit shown consists of the body member 1 having an upwardly projecting tooth 2 with the cutting edge 3 and a rake 4. The body portion 1 is substantially square in cross section and has a depending shank 5 provided with a socket 6 on one side thereof. The shank 5 is likewise substantially square in cross section and is offset relative to the body but is smaller in size, thereby providing an annular shoulder 7 through which the cutting forces are transferred through the bit to the socket in which it is to be inserted. The angle of the rake 4, as shown, is approximately fifty degrees to the vertical or longitudinal axis of the bit. However, this angle may vary in accordance with the characteristics of the machine, its rotary speed and the character of the coal. Both sides of the cutting edge 3 of the tooth may be tipped or otherwise provided with a hardened alloy for the purpose of providing long life of the cutting edge. The cross section of the tooth increases towards the body 1 in the manner of a pyramid until it is substantially the same size as the body 1 as shown in the drawings.

The bit shown in Figs. 4 to 6, inclusive, consists of the body member 1 having the shank 5 with the socket 6 and the annular shoulder 7. This bit is provided with double teeth 8 and 9, each having a cutting point 10 and a rake 11. The outer flanks of the teeth 8 and 9 are parallel with the axis of the bit and the inner flanks are formed by the V-shaped notch 12 which has a sharpened leading edge 13 sloping downwardly towards the rear face and running out at the edge 14 at a considerable distance from the body portion 1. This double or bifurcated tooth is disposed symmetrically to the axis of the bit and the cutting edges 10 lie in a common plane. The forward and rear faces of the teeth slope to the base 1 as shown at 16 and 17.

In the bit structure shown in Figs. 7 and 8, the shank 5 is formed offset with the axis of the bit in the manner similar to the previously described figures and provides the shoulder 7. However, the bifurcated tooth structure is disposed at an angle relative to the body 1 and the shank 5, providing a twist in the form of the double or bifurcated tooth 18 positioning the cutting edges 10 of the teeth in the plane disposed at an angle to the axis of the bit. The cutting edge 13 of the groove 12 between the teeth 8 and 9 is likewise sharpened and will provide a cutting profile in the same manner as the bit disclosed in Figs. 4 to 6, inclusive.

It will be noted from the plan views that the cutting edges and the cutting profiles of the double tooth structure shown in Figs. 4 to 8, inclusive, lies wholly within the dimensions of the body 1 of the bit.

Figs. 9 to 11 show another form of bit having a bifurcated tooth structure wherein the shank 5 is offset relative to the body 1 and the upwardly projecting teeth 8 and 9 have their side faces lying in the same plane as the body 1, but the forward face 20 of the teeth slopes outwardly beyond the body 1 so that the cutting points of the teeth lie beyond the bounds of the body 1 or are said to lead; otherwise, this tooth structure is substantially similar to that disclosed in reference to Figs. 4 to 6.

In the bit structure shown in Figs. 12 to 14, inclusive, the shank 21 is formed integral with the body 1 but is disposed at an angle relative thereto and the cutting forces of the teeth would be transmitted principally through the shoulder 7 together with the additional shoulder 22 along the rear edge of the body 1. The bit retaining socket 6 is placed in the front side of the shank 21 rather than in the rear side as the former figures. The teeth 8 and 9 are otherwise constructed in a manner similar to that disclosed in Figs. 4 to 6 with their sides substantially flush with the body 1 and with the V-shaped groove 12 between the teeth providing the forward cutting edge or profile 13.

The bit structure, as shown in Figs. 15 and 16, provides the shank 5 with its retaining socket 6 on the back thereof and forms an annular shoulder 7 with the body 1. The shank is centered relative to the body but the bifurcated tooth structure 23 leans laterally to one side of the axis of the bit, thus placing the tooth 9 at a higher elevation than the tooth 8 but the cutting points 10 of the teeth lie in a common plane. Such an offset in the bit structure permits an angular disposition of the socket for providing a cutting clearance of the rotary chipping head or for the cutting chain depending upon the use to which the bit is applied.

The structure of Figs. 17 and 18 provides the offset shank 5 disposed to form the shoulder 7 with the body 1 and the other structure is quite similar to that of the sructure disclosed in Figs. 4 to 6 with the exception that the cutting edge 24 of the tooth 9 lies on the opposite side of the bit than that of the cutting edge 10 of the tooth 8. The bottom of the groove 25, which separates the teeth, is substantially horizontal but fairly sharp at both ends. A bit of this construction may be employed as the central or pilot bit and would be mounted on the center of rotation of a rotary chipping head or in the pilot position which would be constructed to position this bit ahead of the remaining teeth mounted on the chipping head. It should also be noted that the cutting edges 10 and 24 of the teeth 8 and 9, respectively, lie in a common plane passing through the vertical axes of the bit.

In the bit structure of Figs. 19 and 20, the shank 5 is offset and disposed relative to the body 1 to provide the annular shoulder 7 and the tooth structure is likewise similar to that disclosed with reference to Figs. 4 to 6. However, the tooth 29 is provided with the cutting edge 26 that is at a lower elevation than the cutting edge 10 of the tooth 8 although it lies in substantially the same plane and the notch 12 is likewise provided with the sharpened edge 13 and slopes from the front to the rear face of the bit. This bit presents the cutting edges of the teeth to the coal face with one tooth leading the other. However, if such a bit is mounted on a progressively receding chipping head, the cutting points of the teeth may lie in a common conical surface produced by placing the bits in a progressively receding manner on the head, or the corresponding points of the cutting profiles may lie in a common transverse plane.

The bit, shown in Figs. 21 and 22, provides for the offset shank 5 disposed to produce the annular shoulder 7 on the body 1. However, the teeth 8 and 9 have their cutting edges 10 and 24 disposed in a manner similar to that disclosed in the bit structure shown in Figs. 17 and 18, but provide for cutting in a clockwise direction of rotation. Another distinction resides in the fact that the teeth 8 and 9 are spread, causing the side faces to overlie the dimensions of the body 1 as illustrated in Fig. 22.

The bit structures of Figs. 23 and 24 are provided with the offset shank 5 positioned relative to the body 1 to form the annular shoulder 7 and the teeth 8 and 9 overhanging the body portion 1 in the manner of the disclosure of Figs. 21 and 22. However, the teeth 8 and 9, with the cutting edges 10, lie in a common plane and the V-shaped trough between the teeth has a sharpened leading edge 13 and a lower trailing edge 14.

The structure as shown in Figs. 25 to 27 illustrates a single tooth bit having a squared shank 5 offset and disposed relative to the body 1 to form the shoulder 7. The single tooth 2, with its cutting edge 3, is offset and positioned with one side face in line with the edge of the body 1 and its other side face sloping gradually to the offset edge of the body 1 as indicated at 27.

The bit shown in Figs. 28, 29 and 30 has two teeth 30 and 31. The front profile of each tooth is larger than the back and the transverse plane of the tooth 30 is disposed at right angles to the front face of the base 1 but the transverse plane of the tooth 31 is disposed at an angle thereto. The front or cutting profiles of each tooth slope back to the center of the tooth and then are provided with a step which extends parallel with the axis of the bit and provides a seal for an alloy 32 such as tungsten carbide.

In the structure of Figs. 31 to 33, the stem 5 is disposed symmetrically within the center of the base 1 and the intermediate teeth 33 and 34 point in opposite directions with their cutting points extending forwardly and outwardly with a shallow sharp pointed web 35 extending therebetween. At opposite corners and matching the intermediate teeth are the outwardly projecting teeth 36 and 37. The cutting points of these teeth extend laterally beyond the base 1 but do not extend upwardly as far as the cutting points of the intermediate teeth 33 and 34.

The points of the intermediate teeth 33 and 34 are faced off as indicated at 38 to angularly abut the material being dug when the bit is rotated and fed forwardly causing the teeth to scribe a helical path in the earth. The intermediate teeth 33 and 34, extending further above the base, thus lead the diagonally positioned teeth 36 and 37. These teeth are not only symmetrical to each other but also to the shank and when rotated on a central axis of the shank, the intermediate teeth break the ground ahead of the cutting points forming a small bore and the diagonal teeth increase the size of the hole. Such a symmetrical bit is employed as a pilot bit in a rotary chipping head. When the face is examined after the machine is retracted it will be noticed that these bits do not have bearing marks but chip the coal clear and usually ahead of the bit points. This illustrates that there is very little resistance to chipping coal with this character of bit. Other bits have been found to leave shiny circular marks on the coal face which indicates a bearing or pressure load rather than a chipping action. The latter digs coal whereas the former merely increases the load without benefit.

Regardless of whether the bit is provided with one or two teeth and regardless of the relative position of the cutting edges, the whole of the front profiles of the teeth on these bits acts as cutting surfaces or profiles and in each instance the tooth increases in cross section from its cutting edge to its base where it becomes integral with the body of the bit. Teeth of this character have been found to continue to cut around their complete profile even though the cutting edge or the outer end portions of the tooth has been chipped or otherwise broken away as when it encounters a hard substance such as a sulphur ball.

While, for clarity of explanation, certain preferred embodiments of this invention have been shown and described, it is to be understood that this invention is capable of many modifications, and changes in the construction and arrangement may be made therein and certain parts may be employed without conjoint use of other parts and without departing from the spirit and scope of this invention.

We claim:

1. A mining machine bit comprising a body, a nonround mounting shank extending from the lower side of said body to retain said bit from turning and to transmit some of the digging forces of the bit, a shoulder on each of three sides of said bit at the juncture of the shank and the body to provide an overhang, polyhedron tooth means projecting from the upper side of said body above the plane of said shoulders, a sharpened apex on said tooth means, said tooth means being in the form of a quadrifron, three sides of said quadrifron tapering from said apex to said body over each of said shoulders to distribute and transmit some of the digging forces over the area of said shoulders and place these three portions of the tooth means in compression, and a fourth side of said quadrifron tooth means extending from said apex to the body at the latter's juncture with the shank placing this portion of the tooth means in tension where there is no shoulder.

2. The structure of claim 1 characterized in that the sides of said quadrifron extend from the perimeter of said body.

3. A mining machine bit comprising a body, a nonround mounting shank extending from the lower side of said body to retain said bit from turning and to transmit some of the digging forces of the bit, a shoulder on each of three sides of said bit at the juncture of the shank and the body to provide an overhang, polyhedron tooth means projecting from the upper side of said body above the plane of said shoulders, a sharpened apex on each tooth means, each of said tooth means being in the form of a quadrifron, the rear of said quadrifrons tapering from the apex to said body over the rear shoulder and the outer sides of said quadrifrons tapering from the apex to said body over its respective side shoulder to distribute and transmit some of the digging forces over the area of said shoulders placing the corresponding portions of said tooth means under compression, and a fourth side of each quadrifron tooth means extending from each apex to the body at the latter's juncture with the shank placing this portion of each tooth means in tension where there is no shoulder.

4. The structure of claim 3 characterized in that each of said teeth extends independently out of said body.

References Cited in the file of this patent

UNITED STATES PATENTS

| | | |
|---|---|---|
| 1,128,878 | Huntley | Feb. 16, 1915 |
| 1,244,785 | Sessions | Oct. 30, 1917 |
| 1,286,008 | Hughes | Nov. 26, 1918 |
| 1,846,177 | Bascom et al. | Feb. 23, 1932 |
| 1,879,222 | Harrington | Sept. 27, 1932 |
| 2,370,369 | Moore | Feb. 27, 1945 |

FOREIGN PATENTS

| | | |
|---|---|---|
| 9,346 | Great Britain | Apr. 20, 1912 |
| 138,982 | Great Britain | Feb. 6, 1919 |
| 528,593 | Great Britain | Nov. 1, 1940 |
| 599,451 | Great Britain | Mar. 12, 1948 |